(12) United States Patent
Subramanian et al.

(10) Patent No.: US 11,704,190 B2
(45) Date of Patent: Jul. 18, 2023

(54) UECC FAILURE HANDLING METHOD

(71) Applicant: Western Digital Technologies, Inc., San Jose, CA (US)

(72) Inventors: Ramkumar Subramanian, Pleasanton, CA (US); Mahim Gupta, San Jose, CA (US); Piyush Sagdeo, Newark, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/507,480

(22) Filed: Oct. 21, 2021

(65) Prior Publication Data

US 2023/0130369 A1    Apr. 27, 2023

(51) Int. Cl.
*G06F 11/07* (2006.01)
*G06F 3/06* (2006.01)
*G06F 11/10* (2006.01)

(52) U.S. Cl.
CPC .......... *G06F 11/0793* (2013.01); *G06F 3/064* (2013.01); *G06F 3/0619* (2013.01); *G06F 3/0652* (2013.01); *G06F 3/0673* (2013.01); *G06F 11/0727* (2013.01); *G06F 11/1076* (2013.01)

(58) Field of Classification Search
CPC ............. G06F 11/0793; G06F 11/0727; G06F 11/1076; G06F 3/0619; G06F 3/064; G06F 3/0652; G06F 3/0673
See application file for complete search history.

(56) References Cited

U.S. PATENT DOCUMENTS

| | | | |
|---|---|---|---|
| 2007/0294588 A1* | 12/2007 | Coulson | G06F 11/1068 714/42 |
| 2015/0286528 A1* | 10/2015 | Cai | H03M 13/1157 714/763 |
| 2017/0255399 A1* | 9/2017 | Yang | G06F 3/064 |
| 2020/0365218 A1* | 11/2020 | Yang | G11C 16/3459 |
| 2021/0082531 A1* | 3/2021 | Shinohara | G11C 16/3472 |
| 2021/0398604 A1* | 12/2021 | Li | G11C 29/4401 |
| 2022/0254434 A1* | 8/2022 | Yeung | G11C 29/42 |

* cited by examiner

*Primary Examiner* — Jigar P Patel
(74) *Attorney, Agent, or Firm* — Patterson + Sheridan, LLP; Steven H. VerSteeg (57) ABSTRACT

A data storage device includes a memory device having a plurality of blocks and a controller coupled to the memory device. The controller is configured to determine that an uncorrectable error correction code (UECC) failure has occurred to a block of the plurality of blocks, enable a UECC anti-strike mechanism, and erase the block. The UECC anti-strike mechanism comprises converting a read failure associated with the block to an erase failure. The controller is further configured to retire the block upon determining that the erase is unsuccessful.

20 Claims, 6 Drawing Sheets

UECC FAILURE HANDLING METHOD

BACKGROUND

Field

Embodiments of the present disclosure generally relate to data storage devices, such as solid state drives (SSDs), and, more specifically, methods to respond to uncorrectable error correction code (UECC) errors.

Description of the Related Art

Data is programmed to and read from blocks of a memory device of a data storage device. When reading the data from the blocks of the memory device as part of a read command received from a host device, the data is decoded and passed to the host device upon successful decoding. However, as data is programmed to and read from the blocks of the memory device, the cells of the memory device may begin to degrade and may not be able to effectively store an electrical charge. During the lifespan of the memory device, voltage distributions corresponding to cell states of the cells of the blocks shift due to the degradation of the cells.

Furthermore, because cells may begin to degrade, read errors, which may be associated with uncorrectable error correction code (UECC) errors, may accumulate, where the data storage device may deliver a read failure indication to the host device upon failing to decode data associated with a read command due to the number of read errors. For example, read errors may be caused by flipped bits. In some cases, a controller of the data storage device may compare even wordline (WL) data with odd WL data after a successful erase verify. A WL to memory hole (WL-MH) defect has a typical electrical signature of an Erase to A-State tail and may be detected by the comparison of the even WL data to the odd WL data.

When a block becomes too degraded to use, such as after about 2 UECC failures, the block is retired and logically removed from use. However, the additional program (e.g., 2+ programs) to the same block that has the at least 2 UECC failures may cause system inefficiencies, such as decreased performance and increased bandwidth use.

Therefore, there is a need for an improved UECC failure handling for a data storage device.

SUMMARY OF THE DISCLOSURE

The present disclosure generally relates to data storage devices, such as solid state drives (SSDs), and, more specifically, methods to respond to uncorrectable error correction code (UECC) errors. A data storage device includes a memory device having a plurality of blocks and a controller coupled to the memory device. The controller is configured to determine that an uncorrectable error correction code (UECC) failure has occurred to a block of the plurality of blocks, enable a UECC anti-strike mechanism, and erase the block. The UECC anti-strike mechanism comprises converting a read failure associated with the block to an erase failure. The controller is further configured to retire the block upon determining that the erase is unsuccessful.

In one embodiment, a data storage device includes a memory device having a plurality of blocks and a controller coupled to the memory device. The controller is configured to determine that an uncorrectable error correction code (UECC) failure has occurred to a block of the plurality of blocks, enable a UECC anti-strike mechanism, where the UECC anti-strike mechanism includes converting a read failure associated with the block to an erase failure, and erase the block.

In another embodiment, a data storage device includes a memory device and a controller coupled to the memory device. The controller is configured to detect an erase tail for a TLC block of the memory device, erase the TLC block, and convert a read failure to an erase failure for the TLC block.

In another embodiment, a data storage device includes memory means and a controller coupled to the memory means. The controller is configured to detect a wordline to memory hole defect for a block and convert a read failure to an erase failure for the block.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, methods to respond to uncorrectable error correction code (UECC) errors. A data storage device includes a memory device having a plurality of blocks and a controller coupled to the memory device. The controller is configured to determine that an uncorrectable error correction code (UECC) failure has occurred to a block of the plurality of blocks, enable a UECC anti-strike mechanism, and erase the block. The UECC anti-strike mechanism comprises converting a read failure associated with the block to an erase failure. The controller is further configured to retire the block upon determining that the erase is unsuccessful.

Figure 1:
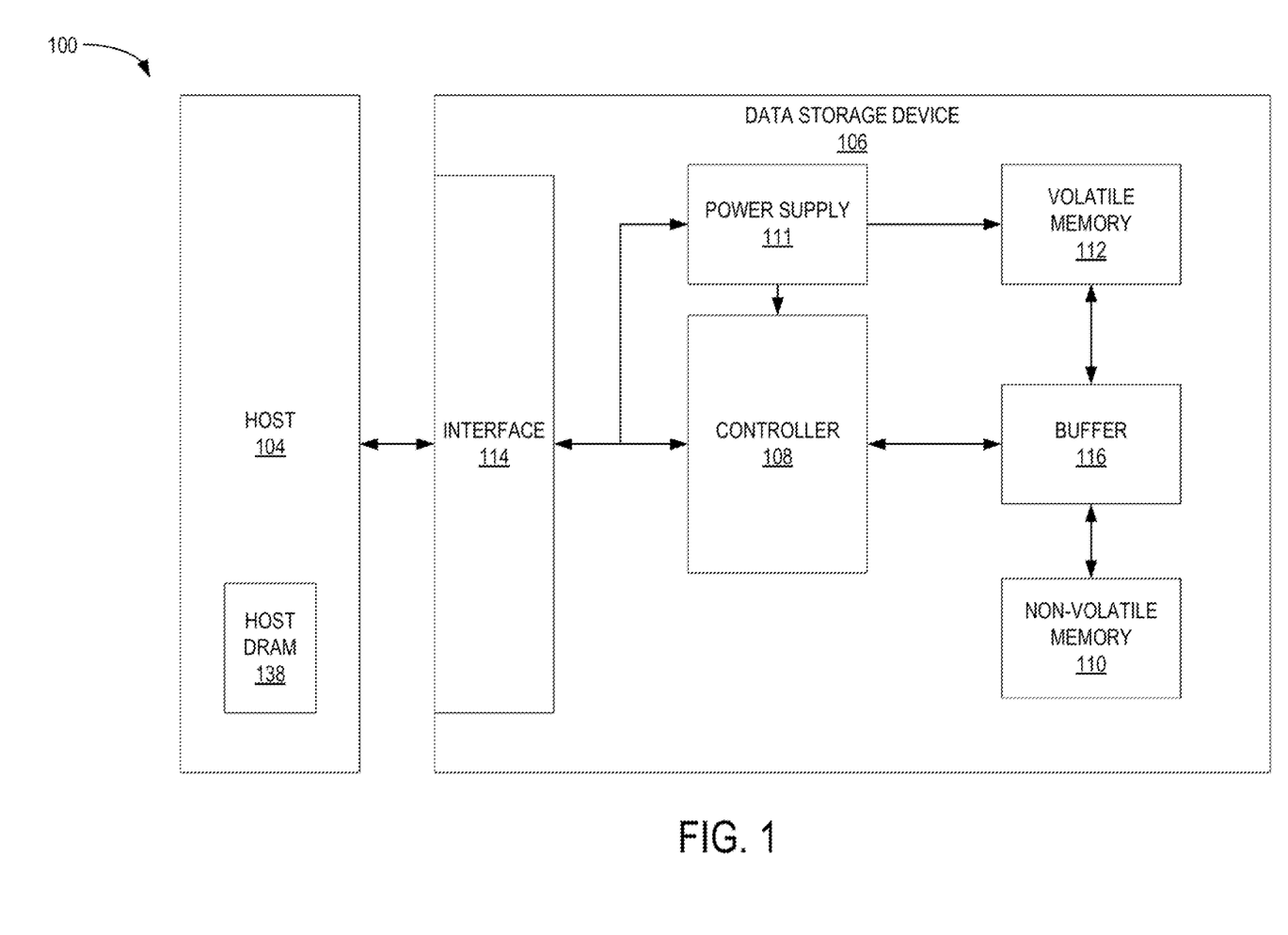
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
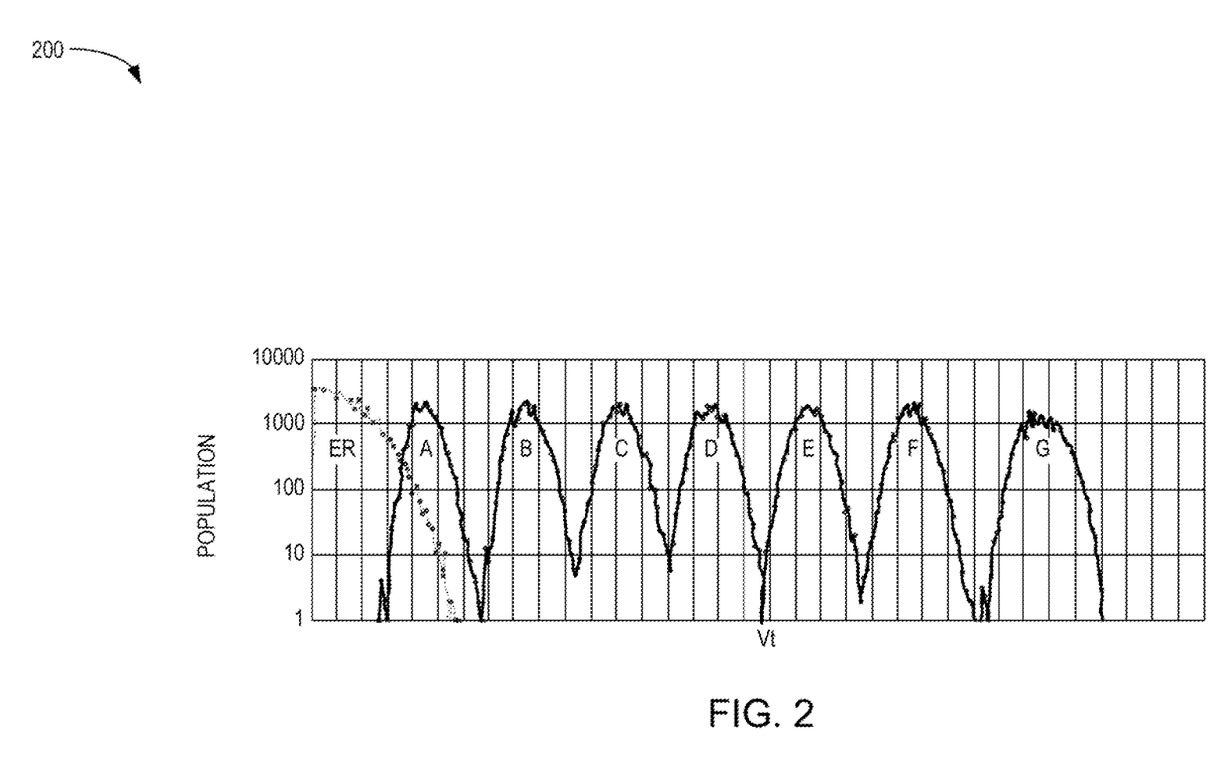
FIG. 2 is an example graph of a TLC memory cell state voltage distribution, according to certain embodiments.

FIG. 2 is an example graph 200 of a TLC memory cell state voltage distribution, according to certain embodiments. It is to be understood that the depiction of a TLC memory cell state voltage distribution is for exemplary purposes and the embodiments described herein may be applicable to other memory densities such as SLC memory, MLC memory, QLC memory, and the like. The number of cell states that a memory density may have may be determined by the following formula: # of cell states $=2^n$, where n refers to the number of cells of the memory cell. For example, because TLC memory has 3 cells, TLC memory has the following 8 cell states: Er, A, B, C, D, E, F, and G.

As shown in FIG. 2, the Er state overlaps with the A state, which may cause a cell state voltage distribution to shift. Because each program erase cycle may cause the memory cell to degrade (e.g., allow electrons to penetrate easier or escape easier), the cell state voltage distribution may be shifted. Furthermore, WL-MH defects may resemble a block level erase fail, a block level program fail, or a block level UECC (read) fail. The block level erase fail, the block level program fail, and the block level UECC (read) fail may all be caused by a shifted cell state voltage distribution or due to a degradation of the memory cell.

Figure 3:
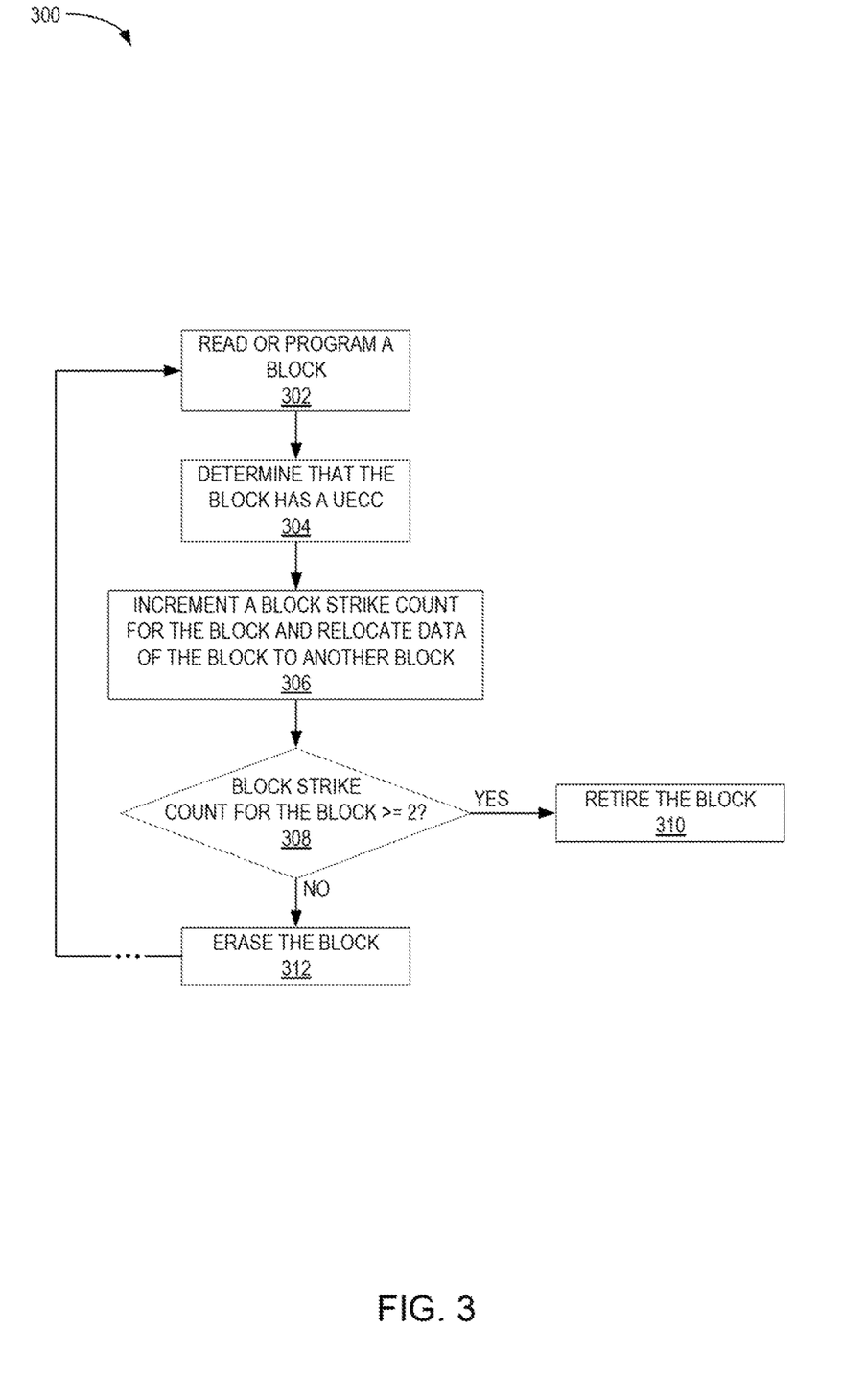
FIG. 3 is a flow diagram illustrating a method of UECC handling, according to certain embodiments.

FIG. 3 is a flow diagram illustrating a method 300 of UECC handling, according to certain embodiments. Method 300 may be executed by a controller, such as the controller 108 of FIG. 1. Aspects of the storage system 100 of FIG. 1 may be referenced in the description herein for exemplary purposes. Although a TLC memory cell may be described herein, it is to be understood that the embodiments described herein are not limited to the TLC memory cell. For example, the embodiments described herein may be applicable to SLC memory, MLC memory, QLC memory, and other memory density iterations.

At block 302, the controller 108 reads a block from the NVM 110 or programs a block to the NVM 110 followed by a read verify of the programmed block. At block 304, the controller 108 determines that the block read from the NVM 110 has a UECC error. The controller 108 may determine that the UECC error may be present after executing a decoding operation or a program verify operation. For example, when the controller 108 reads data from the NVM 110, the data is decoded. When the decoding operation fails due to a high failed bit count (FBC), the controller 108 may determine that the block storing the data has a UECC error.

At block 306, the controller 108 increments a block strike count for the block that has the UECC error and relocates the data to another block. The block strike count refers to a number of times that a block has had a UECC error detected. At block 308, the controller 108 determines if the block strike count of the block is greater than or equal to 2. If the block strike count is greater than or equal to 2 at block 308, then the controller 108 retires the block at block 310. However, if the block strike count is less than 2 at block 308, then the controller 108 erases the block and adds the block to a free block pool to be programmed again.

Figure 4A:
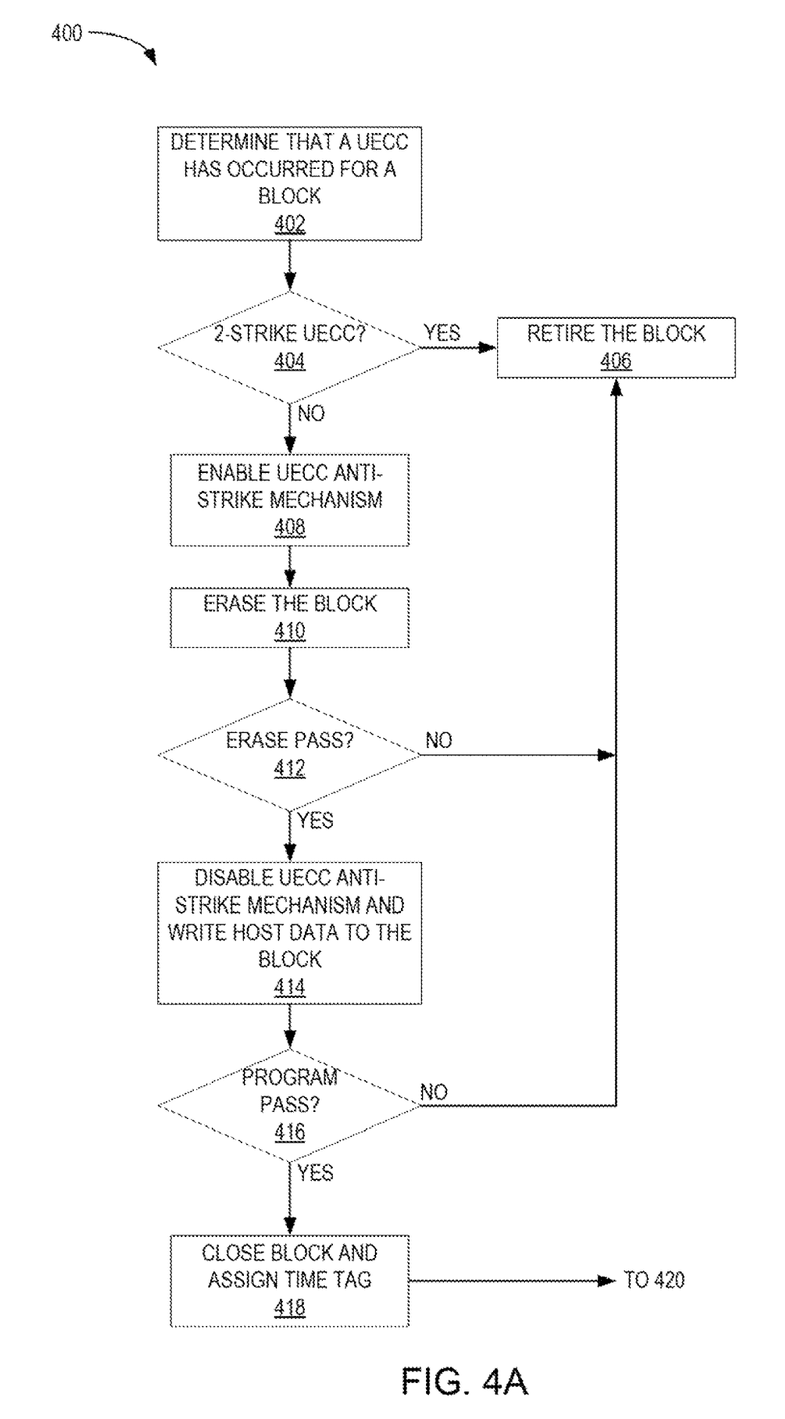
FIGS. 4A-4C are flow diagrams illustrating a method of a UECC anti-strike mechanism, according to certain embodiments.
Figure 4B:
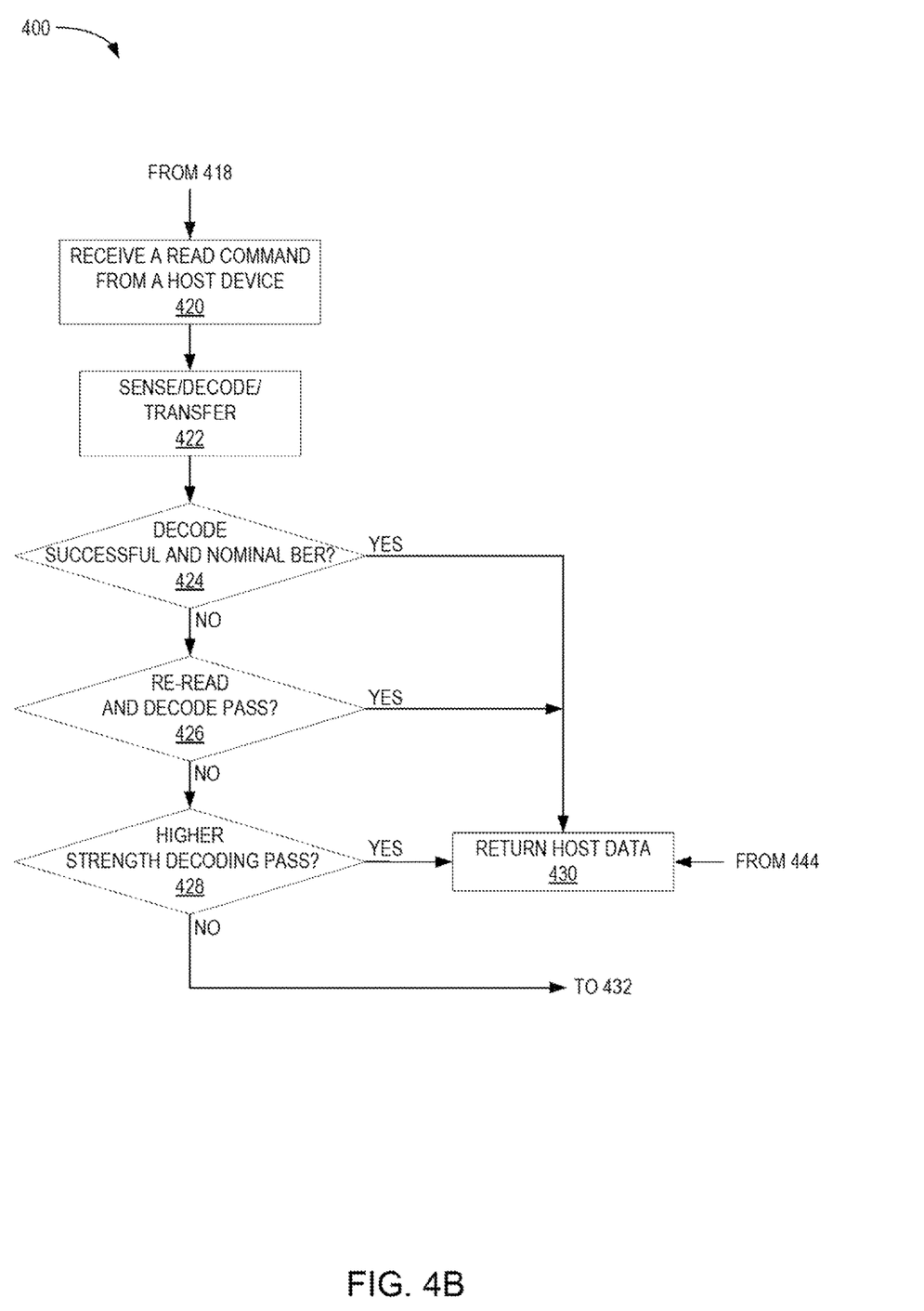
Figure 4C:
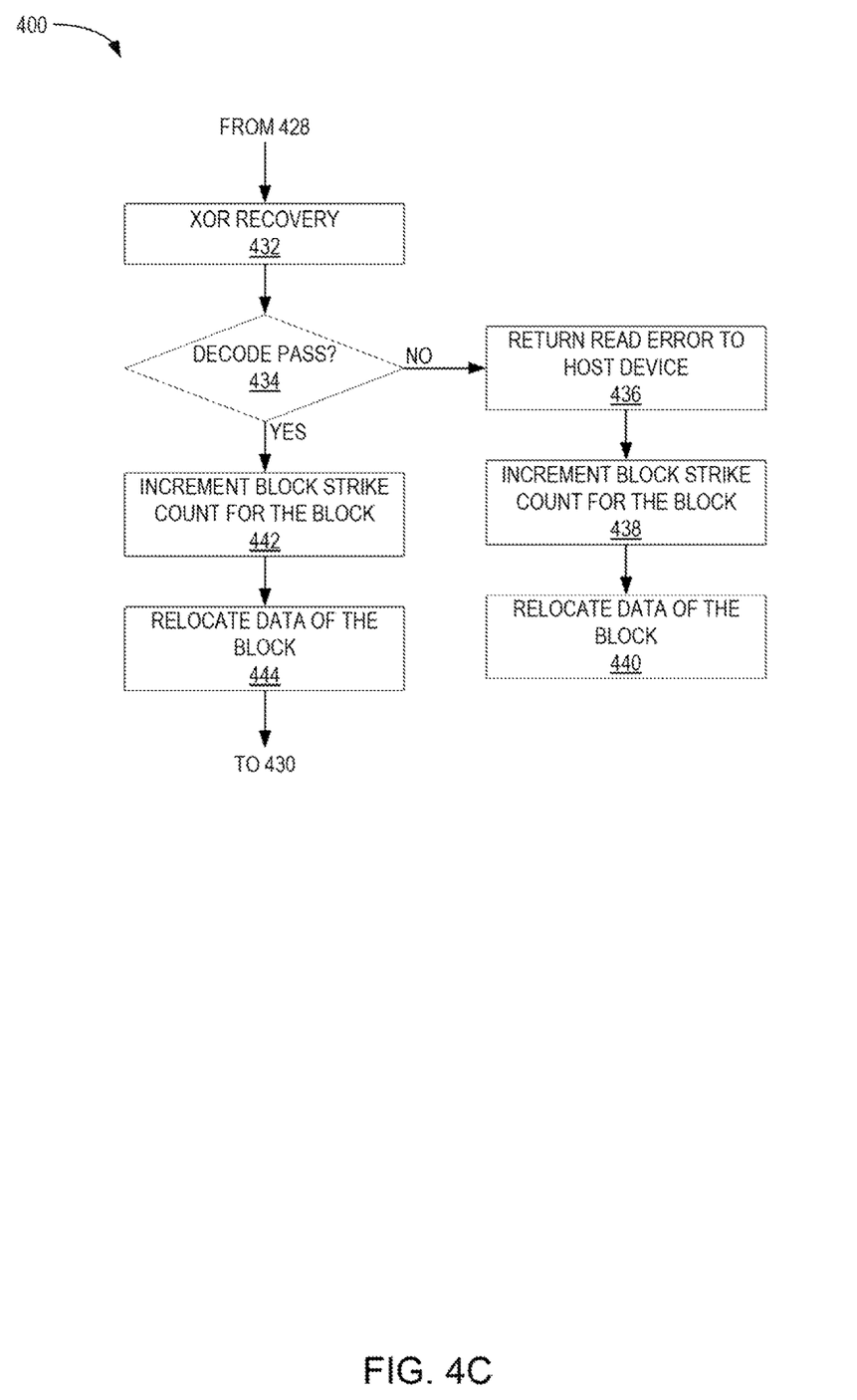

FIGS. 4A-4C are flow diagrams illustrating a method 400 of a UECC anti-strike mechanism, according to certain embodiments. Method 400 may be executed by a controller, such as the controller 108 of FIG. 1. Aspects of the storage system 100 of FIG. 1 may be referenced in the description herein for exemplary purposes. Although a TLC memory cell may be described herein, it is to be understood that the embodiments described herein are not limited to the TLC memory cell. For example, the embodiments described herein may be applicable to SLC memory, MLC memory, QLC memory, and other memory density iterations.

Referring to FIG. 4A, at block 402, the controller 108 determines that a UECC error has been detected for a block of the NVM 110. At block 404, the controller 108 determines if the block strike count of the block is greater than or equal to 2. It is to be understood that the previously listed value is an example of a possible embodiment and other values are contemplated. If the block strike count is greater than or equal to 2 at block 404, then the controller 108 retires the block at block 406. However, if the block strike count is not greater than or equal to 2 at block 404, then the controller 108 enables a UECC anti-strike mechanism at block 408. The UECC anti-strike mechanism includes converting a read failure to an erase failure, which may be completed after erasing the block. In one example, the UECC anti-strike mechanism is enabled on a block by block basis.

At block 410, the controller 108 erases the block and converts the read failure into an erase failure. When the controller 108 erases the block, the controller 108 may further execute an XOR operation between even wordlines and odd wordlines of the block, where a value of 0 is returned for a successful XOR operation and a value of 1 is returned for an unsuccessful XOR operation. At block 412, the controller 108 determines if the erase operation is successful. For example, the controller may compare the data of even wordlines to the data of odd wordlines during the erase verify operation in order to detect an Erase to A-state tail. If the erase operation is not successful at block 412, then the controller 108 retires the block at block 406. However, if the erase operation is successful at block 412, then the controller 108 then disables the UECC anti-strike mechanism and writes host data to the block at block 414. The writing of the host data to the block may be in response to receiving a write command from the host device 104. At block 416, the controller 108 determines if the program passed. The controller 108 may employ, in a non-limiting example, a program verify operation in order to determine if the program was successful. It is to be understood that the previously listed example is not intended to be limiting and other embodiments are contemplated. If the programming operation did not pass at block 416, then the controller 108 retires the block from further use at block 406. However, if the programming operation passed at block 416, then the controller 108 closes the block and assigns a time tag to the block at block 418. Method 400 advances to block 420 of FIG. 4B.

Referring to FIG. 4B, at block 420, the controller 108 receives a read command for the data that was programmed to the block at block 414 of FIG. 4A from the host device 104. At block 422, the controller 108 senses, decodes, and transfers the data from the NVM 110 to the respective data path. At block 424, the controller 108 determines if the decode was successful and if the BER is nominal (i.e., less than or equal to a maximum BER threshold). If the decode was successful and the BER is nominal at block 424, then the controller 108 returns the host data to the host device 104 at block 430. However, if the decode was not successful or the BER is not nominal at block 424, then the controller 108 determines if a re-read and re-decode operation for the data has passed at block 426.

If the re-read operation and the re-decode operation for the data has passed at block 426, then the controller 108 returns the host data to the host device 104 at block 430. However, if the re-read operation or the re-decode operation for the data did not pass at block 426, then the controller 108 determines if any other higher strength/more intensive decoding operations resulted in a decoding pass at block 428. If the higher strength/more intensive decoding operations results in a decoding pass at block 428, then the controller 108 returns the host data to the host device 104 at block 430. However, if the higher strength/more intensive decoding operations does not result in a decoding pass at block 428, method 400 advances to block 432 of FIG. 4C.

Referring to FIG. 4C, at block 432, the controller 108 attempts to perform XOR recovery on the data of the block. At block 434, the controller 108 determines if the decoding of the XOR recovered data has passed. If the decoding was not successful at block 434, then the controller 108 returns a read error to the host device 104 at block 436. At block 438, the controller 108 increments a block strike count for the block. At block 440, the data of the block is relocated to a different block. However, if the decoding was successful at block 434, then the controller 108 increments a block strike count for the block at block 442. At block 444, the data of the block is relocated to a different block. After the data of the block is relocated to the different block at block 442, method 400 returns to block 430 of FIG. 4B, where the data is returned to the host device 104.

By implementing a UECC anti-strike mechanism, a second UECC failure may be avoided, thus increasing data storage device performance.

In one embodiment, a data storage device includes a memory device having a plurality of blocks and a controller coupled to the memory device. The controller is configured to determine that an uncorrectable error correction code (UECC) failure has occurred to a block of the plurality of blocks, enable a UECC anti-strike mechanism, where the UECC anti-strike mechanism includes converting a read failure associated with the block to an erase failure, and erase the block.

The UECC anti-strike mechanism is enabled for each block of the plurality of blocks that has the UECC failure. The converting occurs after erasing the block. The controller is further configured to determine if the erase is successful. The controller is further configured to disable the UECC anti-strike mechanism when the erase is successful. The controller is further configured to retire the block upon determining that the erase is unsuccessful. The UECC anti-strike mechanism compares even wordline data with odd wordline data. The comparing is completed after a successful erase verify. The controller is further configured to detect an electrical signature of an Erase to A-state tail.

In another embodiment, a data storage device includes a memory device and a controller coupled to the memory device. The controller is configured to detect an erase tail for a TLC block of the memory device, erase the TLC block, and convert a read failure to an erase failure for the TLC block.

The TLC block has an uncorrectable error correction code (UECC) failure based on the detecting. The controller is further configured to perform an exclusive or (XOR) operation between even wordlines and odd wordlines of the TLC block after the erasing being successful. The controller is further configured to retire the TLC block based on the XOR operation. The retiring is based on the XOR operation returning a 1 value. The controller is further configured to program host data to the TLC block after the XOR operation returns a 0 and determine if the programming is successful. The controller is further configured to retire the TLC block upon determining that the TLC block has a second UECC failure.

In another embodiment, a data storage device includes memory means and a controller coupled to the memory means. The controller is configured to detect a wordline to memory hole defect for a block and convert a read failure to an erase failure for the block.

The wordline to memory hole defect is a block level erase failure that manifests as the read failure. The wordline to memory hole defect is a block level program failure that manifests as the read failure. The converting occurs for blocks that includes one or more uncorrectable error correction code (UECC) failures.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
 a memory device comprising a plurality of blocks; and
 a controller coupled to the memory device, the controller configured to:
  determine that an uncorrectable error correction code (UECC) failure has occurred to a block of the plurality of blocks;
  enable a UECC anti-strike mechanism for the block, wherein the UECC anti-strike mechanism comprises converting a read failure associated with the block to an erase failure, wherein a block strike count is not incremented for the block upon determining that the UECC failure has occurred to the block, and wherein reaching a block strike count threshold causes the controller to retire the block; and
  erase the block.

2. The data storage device of claim 1, wherein the UECC anti-strike mechanism is enabled for each block of the plurality of blocks that has the UECC failure.

3. The data storage device of claim 1, wherein the converting occurs after erasing the block.

4. The data storage device of claim 1, wherein the controller is further configured to determine if the erase is successful.

5. The data storage device of claim 4, wherein the controller is further configured to disable the UECC anti-strike mechanism when the erase is successful.

6. The data storage device of claim 4, wherein the controller is further configured to retire the block upon determining that the erase is unsuccessful.

7. The data storage device of claim 1, wherein the UECC anti-strike mechanism compares even wordline data with odd wordline data.

8. The data storage device of claim 7, wherein the comparing is completed after a successful erase verify.

9. The data storage device of claim 1, wherein the controller is further configured to detect an electrical signature of an Erase to A-state tail.

10. A data storage device, comprising:
a memory device; and
a controller coupled to the memory device, the controller configured to:
detect an erase tail for a TLC block of the memory device;
enable a UECC anti-strike mechanism for the TLC block, wherein the UECC anti-strike mechanism comprises converting a read failure associated with the TLC block to an erase failure, wherein a block strike count is not incremented for the TLC block upon detecting the erase tail for the TLC block, and wherein reaching a block strike count threshold causes the controller to retire the TLC block;
erase the TLC block; and
convert the read failure to the erase failure for the TLC block.

11. The data storage device of claim 10, wherein the TLC block has an uncorrectable error correction code (UECC) failure based on the detecting.

12. The data storage device of claim 10, wherein the controller is further configured to perform an exclusive or (XOR) operation between even wordlines and odd wordlines of the TLC block during the erasing of the TLC block.

13. The data storage device of claim 12, wherein the controller is further configured to retire the TLC block based on the XOR operation.

14. The data storage device of claim 13, wherein the retiring is based on the XOR operation returning a 1 value.

15. The data storage device of claim 12, wherein the controller is further configured to:
program host data to the TLC block after the XOR operation returns a 0; and
determine if the programming is successful.

16. The data storage device of claim 15, wherein the controller is further configured to retire the TLC block upon determining that the TLC block has a second UECC failure.

17. A data storage device, comprising:
memory means; and
a controller coupled to the memory means, the controller configured to:
detect a wordline to memory hole defect for a block;
enable a UECC anti-strike mechanism for the block, wherein the UECC anti-strike mechanism comprises converting a read failure associated with the block to an erase failure, wherein a block strike count is not incremented for the block upon detecting the wordline to memory hole defect for the block, and wherein reaching a block strike count threshold causes the controller to retire the block; and
convert the read failure to the erase failure for the block.

18. The data storage device of claim 17, wherein the wordline to memory hole defect is a block level erase failure that manifests as the read failure.

19. The data storage device of claim 17, wherein the wordline to memory hole defect is a block level program failure that manifests as the read failure.

20. The data storage device of claim 17, wherein the converting occurs for blocks that includes one or more uncorrectable error correction code (UECC) failures.

* * * * *